United States Patent Office 3,558,200
Patented Jan. 26, 1971

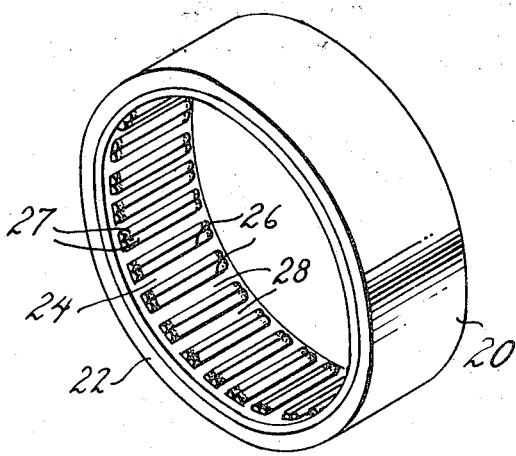
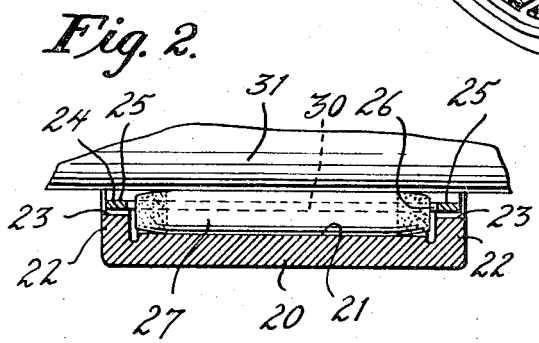
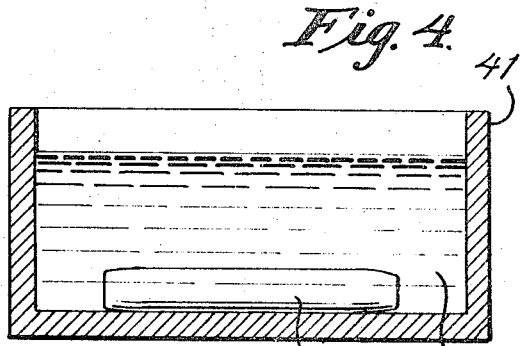
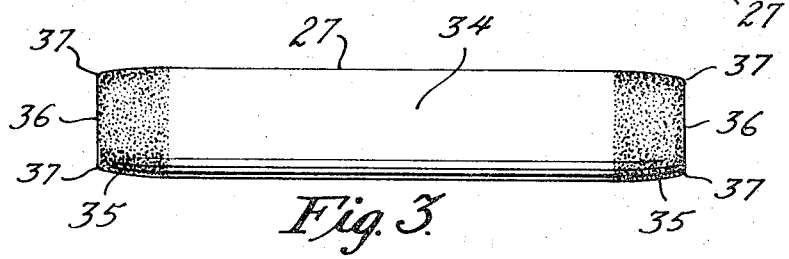
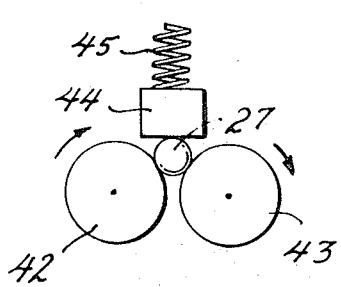
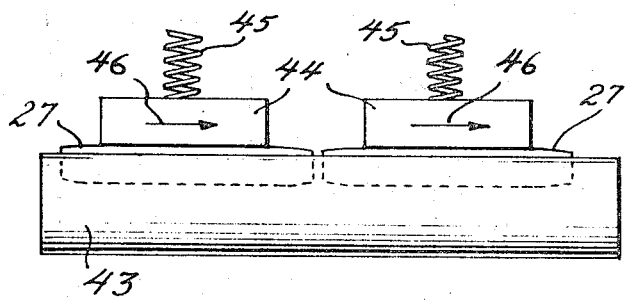

3,558,200
ROLLER BEARING AND METHOD
Victor L. Barr, Jenkintown, Pa., assignor to Roller Bearing Company of America, West Trenton, N.J., a corporation of New Jersey
Filed June 25, 1969, Ser. No. 836,421
Int. Cl. B21d *53/10;* F16c *33/66*
U.S. Cl. 308—187                                 7 Claims

ABSTRACT OF THE DISCLOSURE

In a roller bearing having rollers provided with a cylindrical mid-length section and crown sections at opposite ends, the crown section has surfaces contrasting in color with the mid-length sections. The surfaces on the crown section preferably have superior adherence for lubricant as compared with the mid-section. The rollers may be manufactured by coating the entire outside with a layer having a different color from the steel, for example a black layer, and having a preferential adherence to lubricant in the preferred embodiment, and then removing the coating from the mid-length sections of the rollers, while retaining it on the crown sections.

DISCLOSURE OF INVENTION

The present invention relates to improvements in roller bearings from the standpoint of inspection, and service life, and to methods of making rollers for roller bearings.

Heavily loaded roller bearings are very sensitive to differences in contour of individual rollers and to the behavior of the rollers in service in the end sections.

The invention applies particularly to needle roller bearings in which the rollers are relatively elongated with respect to their diameter, usually having a length of at least three times the roller diameter.

In heavily loaded roller bearings the individual rollers tend to flatten or become more oval as load increases, widening their zone of contact with the race, and elastically indenting the race. If the rollers are not crowned or slightly tapered or coned at the end, there is a tendency for excessive stress and wear to occur at the ends on both rollers and the race, accelerating bearing failure.

It is therefore common in bearings subjected to substantial loads to crown or taper or cone the rollers slightly at each end so that the normal contact between the races and the rollers will occur on a cylindrical mid-length section of each roller. Thus under heavy loads the mid-length section of the roller tends to flatten or become more oval and the greater the load, the more this flattened or oval portion will extend itself into the crowned area. This leads to a new problem, however, because when the roller contacts the race by elastic deflection at both the mid-length section and at a portion of the crown, it will be evident that the diameter of the roller at the mid-length section is greater than the diameter at the crown. A cylindrical mid-length section therefore truly rolls over the cylindrical race surfaces, but the crown because of its difference in radius progresses by a combination of rolling and sliding which gives rise to a scrubbing action between the crown portion of the roller and the race.

Tandem roller bearings of the type of Schmidt U.S. Pat. 3,382,016, granted May 7, 1968, for Arrangement of Tandem Rollers in a Roller Bearing and Method of Assembling the Same, have found important uses as rotor hinge bearings for helicopters. On roller bearings which are used in critical applications such as aircraft, it is very important to be assured that all rollers used in assembling the bearings are properly crowned, and to facilitate inspection of the assembled bearing for this feature.

It will be evident that the difference in diameter between the crowned sections and the mid-length section in a bearing roller is at a maximum between 0.0003 and 0.0005 inch per side, and therefore it is not possible to determine readily by visible inspection whether or not the rollers are crowned.

One of the purposes of the present invention is to provide a distinguishing appearance or color on the crowned roller sections as compared to the mid-length section, so that it will be easy to determine, either in the assembled bearing or by an inspection of the rollers before assembly, whether the rollers are crowned.

Another purpose of the invention is to compensate for the tendency of the crowned section of the roller to progress by a combined rolling and sliding motion by providing a coating on the crowned section which has a preferential tendency to hold lubricant thereon and therefore will reduce friction at the ends.

In the drawings I have chosen for illustration one only of the numerous embodiments in which the invention may appear, selecting the forms shown from the standpoints of convenience in illustration, satisfactory operation, and clear demonstration of the principles involved.

FIG. 1 is a perspective of a bearing to which the principles of the invention have been applied.

FIG. 2 is a fragmentary enlarged axial section of a bearing of FIG. 1, including its shaft or inner race broken away.

FIG. 3 is a side elevation of a bearing roller of the invention.

FIG. 4 is a diagrammatic central vertical section of a molten bath for applying a coating on the bearing rollers.

FIG. 5 shows a diagrammatic end elevation of a roller lapping machine.

FIG. 6 is a diagrammatic side elevation of the roller lapping machine of FIG. 5.

It will be evident that the invention applies to roller bearings, whether as sold they are assembled with only an outer race, or only an inner race, or with a combination of inner-outer races. The invention also applies to bearing rollers sold in bulk.

It will also be evident that the principles of the invention apply to roller bearings having a single roller per window or pocket, and also to roller bearings of the tandem type, having two, three, or more rollers per pocket in the cage. It also will be understood that the principles of the invention apply to bearings not provided with cages.

In FIGS. 1 and 2 I show a tandem roller bearing following the disclosure of Schmidt U.S. Pat. 3,382,016 aforesaid. An outer race 20 has an inner cylindrical race surface 21 and end flanges 22 which are provided with cage engaging cylindrical surfaces 23. A cage 24 which is tubular has endless rims 25 at the opposite ends which engage and ride with suitable clearance on the cage supporting surfaces 23 of the race flanges.

Between the cage rims, windows or pockets 26 have been stamped in the cage. Each of the windows has, in the particular form of bearing shown, two rollers 27 to be described more in detail. The rollers are inserted by the technique described in the Schmidt patent aforesaid and are retained in the windows by cross bars 28 extending between the rims of the cage having retaining surfaces 30 which converge in the direction away from the race surface.

At the opposite sides, from the race surface 21, the rollers engage a shaft 31 or a cooperating race ring as desired.

As best seen in FIG. 3, each of the rollers has a cylindrical mid-length section 34 and tapering crown sections 35 at the opposite ends, suitably terminating in blunt ends 36 and having rounded corners 37.

In accordance with the invention, after the usual grinding of the rollers, they are colored, preferably blackened by any suitable technique, of which several are described in Metals Handbook (ASM 1948) 730, Coloring Steel and 2 Metals Handbook (ASM 1964) 531, Phosphate Coating.

Where the tempering temperature of the steel of the rollers is rather low as in the case of AISI 52100, a black oxide can be formed by heating for a suitable time in a molten salt bath consisting of 37 to 50% by weight of sodium nitrite, 0 to 10% of sodium nitrate, and 50 to 60% of potassium nitrate at 325° F. exposed to air.

Where the steel will stand a much higher temperature without softening, as in the case of M-50, one preferred technique to apply black oxide coating on steel is to use a molten salt bath consisting of a mixture of half sodium nitrate and half potassium nitrate by weight at about 900° F., if the steel will stand this temperature without loss of hardness, preferably adding to the sodium nitrate bath one part of manganese dioxide by weight to 50 parts of the bath.

Another blacking bath is molten sodium hydroxide in air at about 550° F. (if the steel will stand it).

In FIG. 4 a molten salt bath 40 is shown in a container 41, heated by means not shown.

The steel may be darkened by phosphate coating in the manner described in the references above.

Less desirably temper colors can be used to blacken or otherwise color the outside of the rollers providing the temperature is not high enough to reduce the hardness. For example a full blue color can be obtained by heating the rollers in air to 590° F. (provided the steel does not soften).

A gray to black color can be imparted by etching in nitric acid, suitably 4% by weight in ethyl alcohol at room temperature.

Once the rollers have been blackened or otherwise colored on their surface, it is then important to remove the coating from the mid-length 34. This can be done very effectively by running the rollers through a roller lapping machine, as shown diagrammatically in FIGS. 5 and 6.

Rolls 42 and 43 turning in the same direction on parallel spaced axes guide and rotate bearing rollers 27 which are engaged from above by straight roller lapping stones 44 downwardly urged by springs 45 and progressed in the direction of the arrows 46 by a suitable conveyor to take with them the bearing rollers in a forward direction. The stones 44 reciprocate back and forth by mechanism not shown. This removes the coating from the mid-length section of the rollers and creates a color contrast with the colored crown sections.

From the standpoint of inspection therefore, it is very easy to determine whether the rollers have been crowned, since if they have not been crowned the color will be removed from the entire length of the roller circumference by the roller lapping process since the stones extend straight parallel to the axis.

In addition to the great advantage of the invention from the standpoint of ready inspection to determine whether a given roller and in fact all the rollers in the bearing have been crowned, if the coating is of the phosphate type or of the oxide type it has a preferential tendency to hold lubricant on the crown portions as compared to the mid-length section. This is true whether lubricant is grease or oil. Grease, consisting of petroleum oil thickened by a metallic soap, has preferential adhesion to various coatings which can be applied to the crown section, for example the phosphate and oxide coatings, and this tends to reduce the coefficient of friction encountered by the crown sections and at the same time to reduce the wear which might occur by the combination of rolling and sliding which takes place in the crown sections. Oil acts similarly.

The preferential adherence of lubricant on the crown sections is especially important during the time of run-in of the bearing.

The rollers will suitably be made from an alloy steel, such as M-50 or AISI 52100 or other usual roller bearing roller material. It is important that the heating done in connection with applying the coating should not be such as to draw or impair the hardness of the rollers.

Having thus described my invention, what I claim as new and desire to secure by Letters Patent is:

1. A roller bearing comprising race means for supporting rollers having a cylindrical race surface, and a plurality of rollers cooperating with the race means and having cylindrical mid-sections engaging the race surface, and crown sections at opposite ends, the crown sections having surfaces contrasting in color with the mid-sections.

2. A bearing of claim 1, in which the surfaces on the crown sections have preferential adherence for lubricant with respect to the mid-sections, and lubricant in the bearing adhering to the surfaces of the crown sections.

3. A bearing of claim 1, in which the surfaces on the crown sections include an oxide coating.

4. A bearing of claim 1, in which the surfaces on the crown sections include a phosphate coating.

5. A roller bearing roller having a cylindrical mid-section and crown sections at opposite ends, the crown sections having surfaces contrasting in color with the mid-sections.

6. A roller bearing roller of claim 1, in which the surfaces on the crown sections have preferential adherence for lubricant with respect to the mid-sections.

7. A method of treating steel roller bearing rollers having cylindrical mid-sections and crown sections at the opposite ends, which comprises coating the entire outside of the rollers with a layer having a color different from the steel and having a preferential adherence to lubricant, and removing the coating from the mid-sections of the rollers.

References Cited

UNITED STATES PATENTS 2,638,050   5/1953   King _____ 29—148.4

FRED C. MATTERN, JR., Primary Examiner

F. SUSKO, Assistant Examiner

U.S. Cl. X.R.

29—148.4